US005082870A

United States Patent [19]

Fukuda et al.

[11] Patent Number: 5,082,870
[45] Date of Patent: Jan. 21, 1992

[54] METHOD OF MAKING AN ELECTRICALLY CONDUCTIVE POLYURETHANE FOAM

[75] Inventors: Hiroya Fukuda, Yokohama; Masayuki Akou, Ichikawa; Eiji Sawa; Takashi Ohashi, both of Yokohama, all of Japan

[73] Assignee: Bridgestone Corporation, Tokyo, Japan

[21] Appl. No.: 487,123

[22] Filed: Mar. 2, 1990

[30] Foreign Application Priority Data

Mar. 2, 1989 [JP] Japan ................................... 1-48634

[51] Int. Cl.$^5$ ........................ C08G 18/14; C08F 36/00
[52] U.S. Cl. ....................................... 521/159; 521/76; 521/99; 521/123; 521/142; 521/149
[58] Field of Search .................... 252/512, 514; 521/76, 521/99, 123, 142, 149, 159

[56] References Cited

U.S. PATENT DOCUMENTS 4,931,479  6/1990  Morgan ................................. 521/76
4,999,385  3/1991  McCullough, Jr. et al. ........ 521/149

Primary Examiner—John Kight, III
Assistant Examiner—Duc Truong

[57] ABSTRACT

An electrically conductive flexible polyurethane foam having fine and homogeneous cells, being low in swelling by water and superior in dimensional stability can be prepared by mixing an isocyanate terminated urethane prepolymer holding isocyanate monomers therein prepared by reacting polyether polyol(s) holding poly(oxypropylene) chains and not more than 30 weight % of poly(oxyethylene) chains therein with a stoichiometrically excessive amount of an isocyanate component with an aqueous dispersion of electrically conductive carbon particles containing water in excess of the stoichiometric amount necessary to react with the isocyanate monomers in the urethane prepolymer and foaming the mixture in a closed mold having a capacity smaller than the volume of a foam which can be obtained by conducting the foaming of the said mixture of the urethane prepolymer and the aqueous dispersion of electrically conductive carbon particles freely under atmospheric pressure.

3 Claims, No Drawings

METHOD OF MAKING AN ELECTRICALLY CONDUCTIVE POLYURETHANE FOAM

FIELD OF THE INVENTION

The present invention relates to a method of making an electrically conductive polyurethane foam, especially to a method of making an electrically conductive flexible polyurethane foam having fine and homogeneous cells, being low in swelling by water and superior in dimensional stability.

DESCRIPTION OF THE PRIOR ART

Electrically conductive foams have been used for packaging materials for electronic parts, electron insulating materials, etc. making use of their elastic property and porosity.

Further, they have been employed recently in electrostatic controlling rolls for duplicators and printers, and there are demands for fine and homogeneous cells, dimensional stability and durability. However, no electrically conductive polyurethane foam which can satisfy these demands entirely has been available so far.

As a conventional method of making an electrically conductive polyurethane foam, there has been known a method by which electrically conductive carbon particles are incorporated beforehand with resinous liquid for foaming polyurethane and the particles are dispersed into the matrix resin when the foaming is conducted. However, since the viscosity of the carbon-incorporated resinous liquid becomes higher and the foaming does not proceed smoothly, the resultant foams contain large and coarse cells and a foam having an electric resistance of less than 10ohm-cm is hardly available due to a limited amount of the electrically conductive carbon particles which can be incorporated.

To solve these problems, a process of mixing and reacting a so-called hydrophilic prepolymer obtained through a reaction of an isocyanate and a polyether polyol holding poly(oxyethylene) chains and poly(oxypropylene) chains so as to contain 60-100 weight% of poly(oxyethylene) chains therein with an aqueous dispersion of electrically conductive carbon particles containing a stoichiometrically excessive amount of water relative to isocyanate in the prepolymer is disclosed (Japanese Patent Provisional Publication No. Sho 49-69794 and Japanese Patent Publication No. Sho 61-2086).

Electrically conductive polyurethane foam obtained by this method possesses desirable electric conductivity because a large amount of electrically conductive carbon particles can be dispersed in the polyurethane foam. However, since the matrix resin is hydrophilic, the resultant foam has a large dimensional contraction due to the evaporation of water therein and exhibits a large compression set, which makes the foam unsuitable for such usages as the roll.

To overcome the problem, it may be effective to reduce the content of poly(oxyethylene) chains in the copolymerised polyether polyol having poly(oxyethylene) chains and poly(oxypropylene) chains, however, the reduction in the poly(oxyethylene) content lessens the hydrophilic property of the polyol as well as of the prepolymer using thereof to cause collapse of foams, coarsening of cells and growing of cracks to make the method unsuitable to obtain a good foam.

On the other hand, there has been proposed a method of dip-coating an electrically conductive paint on a pre-formed polyurethane foam (Japanese Patent Publication No. Sho 57-24371). In the method, since the electrically conductive substance merely adheres to the resin skeleton constituting cells of the polyurethane foam, there exists a defect that the electric conductivity decreases gradually due to falling of the electrically conductive substance owing to repeated compression, abrasion, etc. Further, when a foam with fine cells is desired, penetration of the electrically conductive paint into the foam becomes so difficult that no stable electrically conductive polyurethane foam with fine cells is substantially obtainable.

SUMMARY OF THE INVENTION

It is an object of the present invention to provide a method of making an electrically conductive flexible polyurethane foam having fine and homogeneous cells, being low in swelling by water and excellent in dimensional stability.

DETAILED DESCRIPTION OF THE PREFERRED EMBODIMENTS

A method of making an electrically conductive polyurethane foam according to the present invention is as follows;

In a method of making an electrically conductive polyurethane foam which comprises mixing an isocyanate terminated urethane prepolymer holding isocyanate monomers therein with an aqueous dispersion of electrically conductive carbon particles containing water in excess of the stoichiometric amount necessary to react with the isocyanate monomers in the urethane prepolymer and foaming the mixture, the improvement which comprises employing an urethane prepolymer prepared by reacting polyether polyol(s) holding poly(oxypropylene) chains and not more than 30 weight% of poly(oxyethylene) chains therein with a stoichiometrically excessive amount of an isocyanate component, and foaming the said mixture of the urethane prepolymer and the aqueous dispersion of electrically conductive carbon particles containing water in excess of the stoichiometric amount necessary to react with the isocyanate monomers in the urethane prepolymer in a closed mold having a capacity smaller than the volume of a foam which can be obtained by conducting the foaming of the said mixture of the urethane prepolymer and the aqueous dispersion of electrically conductive carbon particles freely under atmospheric pressure.

Polyether polyols to be used for production of the above-mentioned urethane prepolymer can be prepared by reacting one or more compounds having more than two reactive hydrogens including such polyalcohols as glycerine, trimethylolpropane, pentaerythritol and sorbitol or amines with propyleneoxide and ethyleneoxide so as to the resultant polyether polyol holds poly(oxypropylene) chains and not more than 30 weight% of poly(oxyethylene) chains therein. The polyol can be either a single polyol holding not more than 30 weight% of poly(oxyethylene) chains relative to the polyol or a mixture of polyols prepared by mixing a polyol holding poly(oxypropylene) chains and more than 30 weight% of poly(oxyethylene) chains therein and a polyol holding no poly(oxyethylene) chains therein in a ratio that the poly(oxyethylene) chains in the mixture is not more than 30 weight% relative to the total polyol.

Urethane prepolymers to be used for the present invention can be prepared by reacting the above-mentioned polyol component with an isocyanate component being in the amount of more than stoichiometric amount relative to the polyol component in order to retain an excessive isocyanate component in the prepolymer. The content of isocyanate monomers therein is preferably 3-30 weight%. When the content is less than 3 weight%, handling of the reactant becomes difficult due to an increased viscosity, and controlling of the density of cellular product becomes difficult due to a smaller amount of generated gas. When the content is above 30 weight%, the amount of generated gas becomes too large to obtain fine cells and result in an impractical product.

Isocyanates usable for preparation of the urethane prepolymer include tolylenediisocyanate (TDI), diphenylmethanediisocyanate (MDI), hexamethylenediisocyanate, naphthalenediisocyanate, cyclohexylmethanediisocyanate, xylenediisocyanate, polymethylpolyphenyldiisocyanate, crude TDI, crude MDI and modified MDI.

The aqueous dispersion of electrically conductive carbon particles is prepared by dispersing in water such electrically conductive carbon particles as carbon black and graphite. The preferable content of carbon particles in the aqueous dispersion is 5-50 weight% in view of dispersibility of the carbon particles and viscosity of the dispersion. As the carbon black, any of furnace black, thermal black, channel black, acetylene black and color black can be used.

In the present invention, in addition to the urethane prepolymer and the aqueous dispersion of electrically conductive carbon particles, such third components as silicone surfactant, amine or tin catalysts and low boiling-point solvents as auxiliary blowing agents are further employable, if necessary. They are not limited to specific ones, and those employed generally for the manufacturing of polyurethane foams can be used.

Mixing ratio the aqueous dispersion of electrically conductive carbon particles to the urethane prepolymer should be settled so that the water contained in the aqueous dispersion is a stoichiometrically excessive amount relative to isocyanate monomers in the urethane prepolymer. When the amount of the aqueous dispersion is too small, it becomes hard to incorporate enough electrically conductive carbon particles in the resultant polyurethane foam to provide sufficient electric conductivity, and further, no fine cells intended by the present invention are available due to an increased expansion ratio of foaming. No upper limit exists for the amount of water, however, water amounting more than 30 times of the stoichiometric amount relative to isocyanate monomers in the urethane prepolymer makes homogeneous mixing to be difficult due to incompatibility with the urethane prepolymer.

The mold to be used for the invention is a closed type, and the capacity of the mold should be set so as to be smaller than the volume of a foam which can be obtained by conducting the foaming of the said mixture of the urethane prepolymer and the aqueous dispersion of electrically conductive carbon particles freely under atmospheric pressure. When such mold is used, it is presumed that foams inside of the mold are inevitably compressed stronger than under atmospheric pressure, and so the pressurized molding in the mold stabilizes cells which tend to coarsen and grow cracks when subjected to free foaming under atmospheric pressure.

The ratio of the capacity of the mold to the volume of foam which can be obtained by conducting the foaming freely under atmospheric pressure should be at least smaller than 1, preferably in the range of 0.5-0.9. When the ratio is smaller than 0.5, pressure brought about to the mold during foaming becomes so high as to make designing of the mold difficult, and further, cells formed becomes closed ones requiring a longer time for the pressure release of the mold to deteriorate the productivity. When the ratio is larger than 0.9, coarse cells tend to be formed.

EXAMPLE 1

A polyether polyol having a molecular weight of 5000 and a poly(oxyethylene) chain content of 20 weight% was prepared by reacting propyleneoxide and ethyleneoxide with glycerine. 100 grams of the polyether polyol was reacted with 25 grams of tolylenediisocyanate (2,6 isomer 20%: produced by Nippon Polyurethane Co.: TDI 80) to obtain an urethane prepolymer having an isocyanate content of 7.5 weight%.

To 100 grams of the urethane prepolymer were added 25 grams of an aqueous dispersion containing 8 weight% of electrically conductive carbon black (produced by Lion Co.: W-311N), 1 gram of N-methylmorpholine and 0.3 gram of triethylamine as reaction activating catalysts, and 1.5 grams of a silicone surfactant (produced by Nippon Unicar Co.: L-520). The resultant mixture was agitated for 8 seconds then poured instantly into a mold having a capacity of 900 cm$^3$.

In this case, the amount of added water to isocyanate monomers in the urethane prepolymer was 12 times more than the stoichiometric amount.

When a raw material of the same formulation and the same amount was foamed freely under atmospheric pressure, volume of the foam was 1125 cm$^3$.

After the passage of time necessary for curing of the foamed liquid (about 10 minutes), pressure inside of the mold was released and a foam was taken out. An excellent electrically conductive polyurethane foam with fine cells having physical properties shown in Table 1 was obtained.

EXAMPLE 2

Using a foaming machine for polyurethane foams, 6200 grams of the raw material composition same with that employed in Example 1 was charged into an aluminum mold of 550 mm width, 550 mm length and 150 mm height and closed to cause foaming. After about 15 minutes, an electrically conductive polyurethane foam was taken out, which was excellent with no crack. The physical properties of the foam are shown in Table 1.

TABLE 1

| Evaluating item | | Example 1 | Example 2 |
|---|---|---|---|
| Density (g/cm$^3$) | | 0.12 | 1.11 |
| Number of cells (pieces/inch) | 1) | 89 | 90 |
| Elongation (%) | 2) | 300 | 330 |
| Tensile strength (Kg/cm$^2$) | 3) | 2.2 | 2.3 |
| Compression set (%) | 4) | 8.42 | 7.14 |
| Conductivity ($\Omega \cdot$ cm) | 5) | $3.0 \times 10^5$ | $2.3 \times 10^5$ |

TABLE 1-continued

| Evaluating item | Example 1 | Example 2 |
|---|---|---|
| Swelling by water (%) 6) | 2.0 | 2.2 |

Note:
1): Count numbers of cells per one inch using a magnifier of 50 times enlargement
2) 3): measured in accordance with JIS K 6301
4): measured in accordance with JIS K 6401
5): calculated by the following formula in accordance with the Japan Rubber Association's Standard Specification SRIS-2031;

$$\rho v = \frac{WT}{L} \cdot R$$

$\rho v$ = Volume resistivity ($\Omega \cdot cm$)
W = Width of specimen (cm)
T = Thickness of specimen (cm)
L = Width of electrodes applying voltage (cm)
R = Resistance measured ($\Omega$)
6): Dip in water for about one hour and calculated with the following formula;

$$\text{Swelling by water (\%)} = \frac{\text{Swelled size} - \text{Dry size}}{\text{Dry size}} \times 100$$

COMPARATIVE EXAMPLE 1

In the same manner as Example 2, a raw material composition of the same formulation and the same amount with those of Example 2 was poured into an open mold of 550 mm width, 550 mm length and 300 mm height and caused to foam freely under atmospheric pressure.

The foam taken out from the mold after 15 minutes had cracks and coarse cells with a resistivity of above $1 \times 10^8$ ohm.cm, which was not usable as the electrically conductive polyurethane foam usable for various purposes.

COMPARATIVE EXAMPLE 2

To 100 grams of an urethane prepolymer same with that prepared in Example 1 was added 2 grams (the amount of carbon black relative to urethane prepolymer was equivalent to that of Example 1) of fine powder of electrically conductive carbon black (produced by Lion-Akzo Co.:Ketchen black EC: the same material contained in the aqueous dispersion of electrically conductive carbon black used in Example 1), and the resultant was tried to cause foaming. However, viscosity of the urethane prepolymer increased so remarkably that its agitation-mixing was impossible.

COMPARATIVE EXAMPLE 3

A polyether polyol with a molecular weight of 5000 and holding 60 weight% of poly(oxyethylene) chains was prepared by reacting glycerine with propyleneoxide and ethylene oxide. In the same manner as Example 1, 100 grams of the polyol was reacted with 25 grams of tolylenediisocyanate to obtain an urethane prepolymer having a NCO content of 7.5 weight%. Other than using thus obtained urethane prepolymer, the same composition with that of Example 1 was mixed and foamed freely under atmospheric pressure to obtain a nice foam with no crack nor coarse cell. However, the foam showed a large swelling by water of 13% and was unstable against water having a compression set of 23%, which proved to be unsuitable for such usages as rolls for duplicators.

COMPARATIVE EXAMPLE 4 AND EXAMPLE 3

Polyether polyols with a molecular weight of 5000 and holding varied amounts of from 0% to 100 weight% of poly(oxyethylene) chains were prepared by reacting glycerine with propyleneoxide and ethyleneoxide. In the same manner as Example 1, 100 grams of each polyol were reacted with 25 grams tolylenediisocyanate respectively to obtain urethane prepolymers having a NCO content of 7.5 weight%. Other than using thus obtained urethane prepolymers, the same compositions with that of Example 1 were foamed freely under atmospheric pressure, and characteristics of the foams are shown in Table 2.

The same compositions with those of Comparative Example 4 were prepared in the closed mold in the same manner as that of Example 1, and characteristics of the foams are shown in Table 3.

TABLE 2

| | (Comparative Examples) | | | | |
|---|---|---|---|---|---|
| | Content of poly(oxyethylene) chains in polyol | | | | |
| Evaluating item | 0% | 10% | 30% | 50% | 100% |
| Appearance of foam | cell collapsed | cell collapsed mostly | cell collapsed partially | foamed well | foamed well |
| Number of cells (pieces/inch) | — | — | 30 | 50 | 70 |
| Swelling by water (%) | 0 | 0.5 | 9.5 | 16.5 | 35.5 |

Note:
Measuring methods for Numbers of cells and Swelling by water are mentioned in Table 1.

TABLE 3

| | Content of poly(oxyethylene) chains in polyol | | | | |
|---|---|---|---|---|---|
| Evaluating item | 0% | 10% | 30% | 50% | 100% |
| Number of cells (pieces/inch) | 50 | 80 | 88 | 80 | 95 |
| Compression set | 8.5 | 7.8 | 9.8 | 25.0 | 45.0 |
| Swelling by water (%) | 0 | 0.5 | 8.5 | 18.0 | 32.5 |
| Remarks | Example | Example | Example | Comp. Ex. | Comp. Ex. |

Note:
Measuring methods for Numbers of cells and Swelling by water are mentioned in Table 1.

A compression set of below 10% and swelling by water of less than 10% are requested for foams usable a rolls, and Examples obtained by employing polyether polyol holding poly(oxypropylene) chains and not more than 30 weight% of poly(oxyethylene) chains were satisfactory for the demand.

EXAMPLE 4

In 100 grams of a polyol having a molecular weight of 4500 prepared by reacting glycerine with propyleneoxide only was incorporated 50 grams of a polyether polyol having a molecular weight of 5000 prepared by reacting glycerine with ethyleneoxide only, and obtained a blended polyol holding 30 weight% of poly(oxyethylene) chains therein. An urethane prepolymer was prepared by reacting 100 grams of the blended polyol with 25 grams of tolylenediisocyanate.

In the same manner with Example 1, an electrically conductive polyurethane foam was prepared in the closed mold. Characteristics of the foam are shown in Table 4.

TABLE 4

| Evaluating item | Example 4 |
|---|---|
| Density (g/cm$^3$) | 0.12 |
| Numbers of cell (pieces/inch) | 80 |
| Elongation (%) | 250 |
| Temsile strength (Kg/cm$^2$) | 1.8 |
| Compression set (%) | 10.1 |
| Electric conductivity ($\Omega \cdot cm$) | $4.0 \times 10^5$ |

TABLE 4-continued

| Evaluating item | Example 4 |
|---|---|
| Swelling by water (%) | 9.0 |

Note:
Measuring methods for each item is mentioned in Table 1.

A foam with compression set of about 10% and swelling by water of less than 10% was obtained.

What is claimed is:

1. In a method of making an electrically conductive polyurethane foam which comprises mixing an isocyanate terminated urethane prepolymer holding isocyanate monomers therein with an aqueous dispersion of electrically conductive carbon particles containing water in excess of the stoichiometric amount necessary to react with the isocyanate monomers in the urethane prepolymer and foaming the mixture, the improvement which comprises employing an urethane prepolymer prepared by reacting polyether polyol(s) holding poly(oxypropylene) chains and not more than 30 weight% of poly(oxyethylene) chains therein with a stoichiometrically excessive amount of an isocyanate component, and foaming the said mixture of the urethane prepolymer and the aqueous dispersion of electrically conductive carbon particles containing water in excess of the stoichiometric amount necessary to react with the isocyanate monomers in the urethane prepolymer in a closed mold having a capacity smaller than the volume of a foam which can be obtained by conducting the foaming of the said mixture of the urethane prepolymer and the aqueous dispersion of electrically conductive carbon particles freely under atmospheric pressure.

2. The method of claim 1 wherein the capacity of the closed mold is 0.5-0.9 times of the volume of a foam obtained by conducting the foaming of the mixture of the urethane prepolymer and the aqueous dispersion of electrically conductive carbon particles freely under atmospheric pressure.

3. The method of claim 1 wherein the urethane prepolymer holds 3-30 weight% of isocyanate monomers.